United States Patent
Broomer et al.

(10) Patent No.: US 8,292,573 B2
(45) Date of Patent: Oct. 23, 2012

(54) FLANGE COOLED TURBINE NOZZLE

(75) Inventors: Mark Broomer, Boston, MA (US); Robert Francis Manning, Newburyport, MA (US); Haidong Liu, Waltham, MA (US)

(73) Assignee: General Electric Company, Schenectady, NY (US)

( * ) Notice: Subject to any disclaimer, the term of this patent is extended or adjusted under 35 U.S.C. 154(b) by 518 days.

(21) Appl. No.: 12/427,072

(22) Filed: Apr. 21, 2009

(65) Prior Publication Data

US 2010/0266386 A1 Oct. 21, 2010

(51) Int. Cl.
*F01D 25/08* (2006.01)
(52) U.S. Cl. ...................... 415/178; 415/209.2
(58) Field of Classification Search .................. 415/178, 415/209.2
See application file for complete search history.

(56) References Cited

U.S. PATENT DOCUMENTS

| | | | |
|---|---|---|---|
| 3,034,298 A | 5/1962 | White | |
| 3,628,880 A * | 12/1971 | Smuland et al. .............. 415/175 | |
| 4,187,054 A | 2/1980 | Landis, Jr. et al. | |
| 4,353,679 A | 10/1982 | Hauser | |
| 4,702,670 A | 10/1987 | Winter | |
| 5,131,814 A | 7/1992 | Przytulski et al. | |
| 5,211,536 A | 5/1993 | Ackerman et al. | |
| 5,224,822 A | 7/1993 | Lenahan et al. | |
| 5,252,026 A | 10/1993 | Shepherd | |
| 5,358,374 A | 10/1994 | Correia et al. | |
| 5,470,198 A | 11/1995 | Harrogate et al. | |
| 5,555,721 A | 9/1996 | Bourneuf et al. | |
| 5,609,466 A | 3/1997 | North et al. | |
| 5,636,439 A | 6/1997 | Cunha et al. | |
| 5,823,741 A | 10/1998 | Predmore | |
| 6,065,928 A | 5/2000 | Rieck, Jr. et al. | |
| 6,077,035 A | 6/2000 | Walters et al. | |
| 6,126,400 A | 10/2000 | Nichols et al. | |
| 6,139,257 A * | 10/2000 | Proctor et al. ................ 415/115 |
| 6,354,797 B1 | 3/2002 | Heyward et al. | |
| 6,398,488 B1 | 6/2002 | Solda et al. | |
| 6,481,959 B1 | 11/2002 | Morris et al. | |
| 7,089,741 B2 * | 8/2006 | Ikeda et al. ..................... 60/725 |
| 7,121,793 B2 | 10/2006 | Correia | |
| 7,140,835 B2 | 11/2006 | Lee et al. | |
| 2003/0161716 A1 | 8/2003 | Nguyen | |
| 2003/0161726 A1 | 8/2003 | Lu | |

(Continued)

FOREIGN PATENT DOCUMENTS

EP 1146202 A2 10/2001

(Continued)

OTHER PUBLICATIONS

GB 1006499.6, Search Report, Jun. 23, 2010.
U.S. Appl. No. 12/139,568, filed Jun. 16, 2008, Schilling et al.

(Continued)

*Primary Examiner* — Julio J Maldonado
*Assistant Examiner* — Robert Bachner
(74) *Attorney, Agent, or Firm* — General Electric Company; David J. Clement; William Scott Andes

(57) ABSTRACT

A turbine nozzle includes outer and inner bands bounding nozzle vanes. The outer band includes an aft flange. An impingement baffle bridges the outer band and aft flange at the root thereof to provide impingement cooling.

20 Claims, 3 Drawing Sheets

U.S. PATENT DOCUMENTS

| | | |
|---|---|---|
| 2004/0258517 A1 | 12/2004 | Naik |
| 2005/0135920 A1* | 6/2005 | Synnott et al. ................ 415/115 |
| 2006/0127212 A1 | 6/2006 | Durocher et al. |
| 2008/0112791 A1 | 5/2008 | Lee et al. |

FOREIGN PATENT DOCUMENTS

| | | |
|---|---|---|
| GB | 2210415 A | 6/1989 |
| JP | 11247621 A | 9/1999 |
| JP | 11257003 A | 9/1999 |

OTHER PUBLICATIONS

GE Aviation, "F404 Turbine Nozzle, Outer Band," on sale and in commercial public use in USA for more than 1 year before Mar. 1, 2009; single page.

GE Aviation, "CT7 Turbine Nozzle," on sale and in commercial public use in USA for more than 1 year before Mar. 1, 2009; 2 pages.

GB1006499.6, Great Britain Search Report and Written Opinion, Nov. 9, 2010.

* cited by examiner

FLANGE COOLED TURBINE NOZZLE

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases. Energy is extracted from the gases in turbine stages which power the compressor and a shaft that typically drives a fan in an aircraft turbofan engine application.

A high pressure turbine (HPT) directly follows the combustor and receives the hottest gases therefrom from which energy is initially extracted. A low pressure turbine (LPT) follows the HPT and extracts additional energy from the gases.

The first stage turbine nozzle includes radially outer and inner bands bounding a row of hollow nozzle vanes. Various cooling circuits are provided in the nozzle for cooling the various parts thereof to limit temperature and ensure long life.

The nozzle is typically mounted in the engine by an integral mounting flange extending inwardly from the inner band.

The outer band of the nozzle is suitably configured to bound the hot combustion gas flow between the outlet end of the combustor and the surrounding turbine shroud of the first stage turbine rotor blades.

The outer band includes a forward radial flange and a corresponding seal joining the outer liner of the combustor. An aft radial flange axially adjoins the hanger supporting the turbine shroud and includes a W-seal in an exemplary configuration.

This aft seal is axially compressed between a seat in the aft flange and the hanger, and substantial axial compression preloads are maintained through the aft flange upon assembly.

The aft flange therefore is relatively stiff to support reaction forces from the shroud hanger, and such stiffness is typically provided by a relatively thick aft flange, particularly at its root junction with the aft end of the outer band.

The thick aft flange increases the thermal mass thereof and increases the difficulty of cooling during operation.

Cooling is typically provided in the turbine nozzle by channeling compressor discharge pressure (CDP) air over the outer band with portions thereof being channeled through internal chambers of the vanes.

The outer band may include arrays of film cooling holes distributed therethrough. The aft flange itself may include cooling holes extending axially aft therethrough.

However, any cooling air directly channeled through the aft flange bypasses the turbine nozzle vanes and decreases nozzle performance as chargeable air.

Conversely, cooling air which is discharged inwardly through the outer band is therefore recovered between the nozzle vanes and retains performance as non-chargeable air.

The complex aft flange of the nozzle outer band typically requires trade-offs in design for carrying the high preloads within acceptable stress limits, while also being adequately cooled for nozzle life.

However, the thick aft flange limits the ability to effectively cool the flowpath, and experience has shown that insufficient cooling leads to thermal distress of the aft flange and outer band thereat which reduces nozzle life.

Accordingly, it is desired to provide a turbine nozzle having an outer band with improved cooling of the aft flange using non-chargeable flow.

BRIEF DESCRIPTION OF THE INVENTION

A turbine nozzle includes outer and inner bands bounding nozzle vanes. The outer band includes an aft flange. An impingement baffle bridges the outer band and aft flange at the root thereof to provide impingement cooling.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
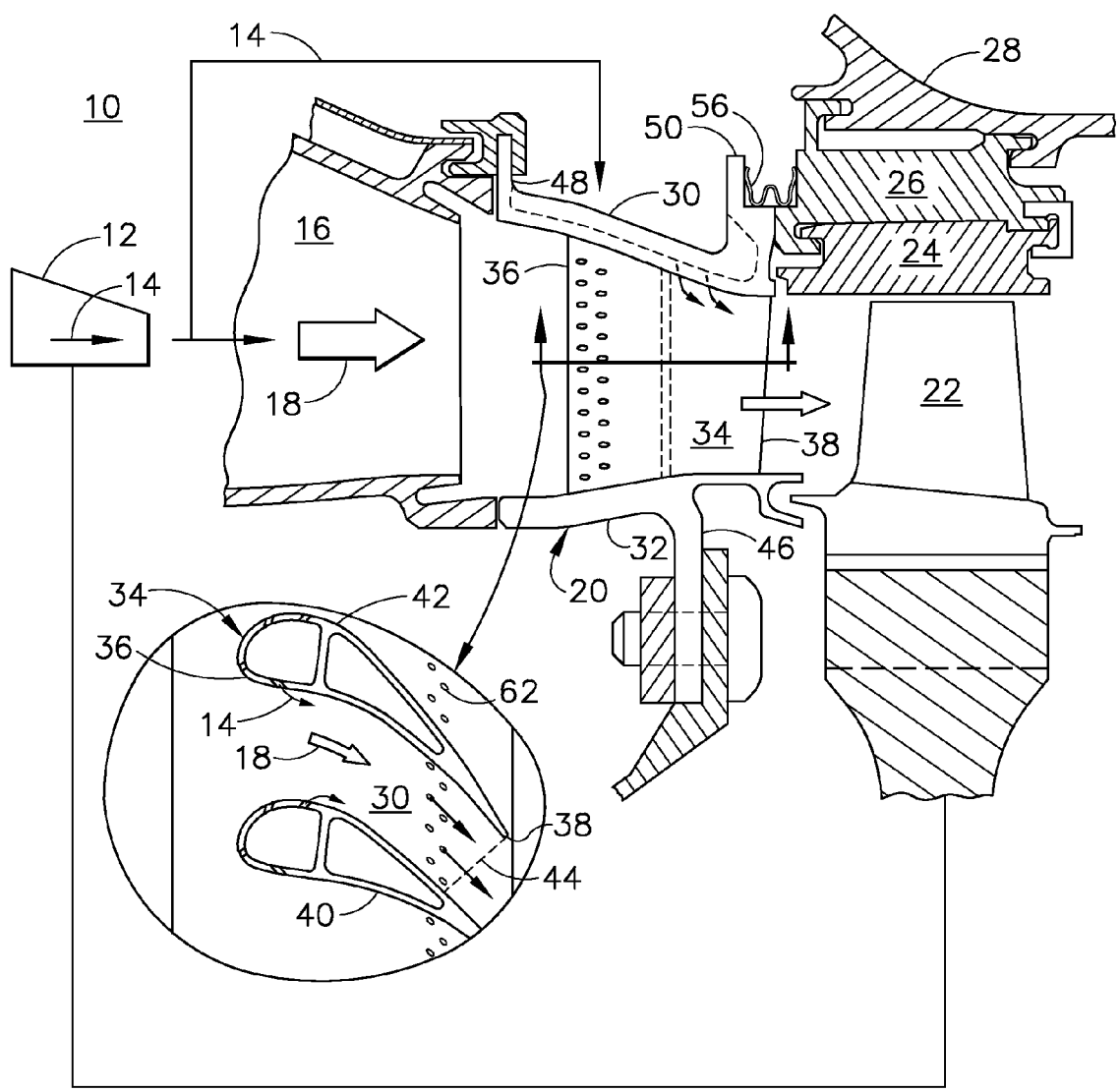
FIG. 1 is a partly sectional axial view of a gas turbine engine including an improved first stage turbine nozzle.

Illustrated schematically in FIG. 1 is a gas turbine engine 10 which is axisymmetrical about a longitudinal or axial centerline axis. The engine includes a conventional compressor 12 configured for pressurizing air 14 during operation.

The compressed air 14 is discharged from the compressor at maximum CDP pressure and is suitably channeled to an annular combustor 16, shown in aft part, wherein it is mixed with fuel and ignited for generating hot combustion gases 18.

The combustion gases are discharged from the outlet end of the combustor and first enter the first stage turbine nozzle 20 of the HPT. Directly following the nozzle 20 is a row of first stage turbine rotor blades 22 extending radially outwardly from a supporting rotor disk. The disk is joined by a drive shaft to the rotor of the compressor 12 for rotating the compressor blades thereof during operation.

Surrounding the turbine blades 22 is an annular turbine shroud 24 suitably supported inside an annular hanger 26, which in turn is supported from the annular outer casing 28 of the engine.

The first stage turbine nozzle 20 includes radially outer and inner annular bands 30,32 joined to opposite radial ends of a row of hollow nozzle vanes 34.

The nozzle is typically segmented circumferentially in nozzle doublets each having arcuate portions of the outer and inner bands integrally formed with two nozzle vanes.

The nozzle is typically formed of superalloy metal cast with high strength metallurgical properties. For example, single crystal castings may be made with a single nozzle vane and corresponding band segments which are typically brazed together to create the two vane doublet.

Each vane includes axially opposite leading and trailing edges 36,38 and circumferentially opposite pressure and suction sides 40,42 extending radially between the bands. The pressure side 40 is generally concave, and the suction side 42 is generally convex in the typical airfoil shape tapering to the thin trailing edge 38.

The vanes are bound radially by the bands 30,32 and spaced laterally or circumferentially apart to define corresponding flow passages through which the combustion gases 18 flow during operation.

Each flow passage terminates at a throat 44 of minimum flow area defined between the trailing edge 38 of one vane perpendicular to the suction side of the next vane slightly upstream from the trailing edge thereof.

In this way, the nozzle passages or flowpaths converge to the throats for maximizing aerodynamic performance thereof.

The inner band 32 typically includes an annular mounting flange 46 extending radially inwardly therefrom for being suitably supported on a central support cone.

The outer band 30 includes a forward flange of 48 extending radially outwardly therefrom and cooperates with a suitable seal at the aft end of the outer liner of the combustor 16.

The outer band also includes an aft flange 50 at the opposite aft end thereof extending radially outwardly above the trailing edges 38 and throats 44.

Figure 2:
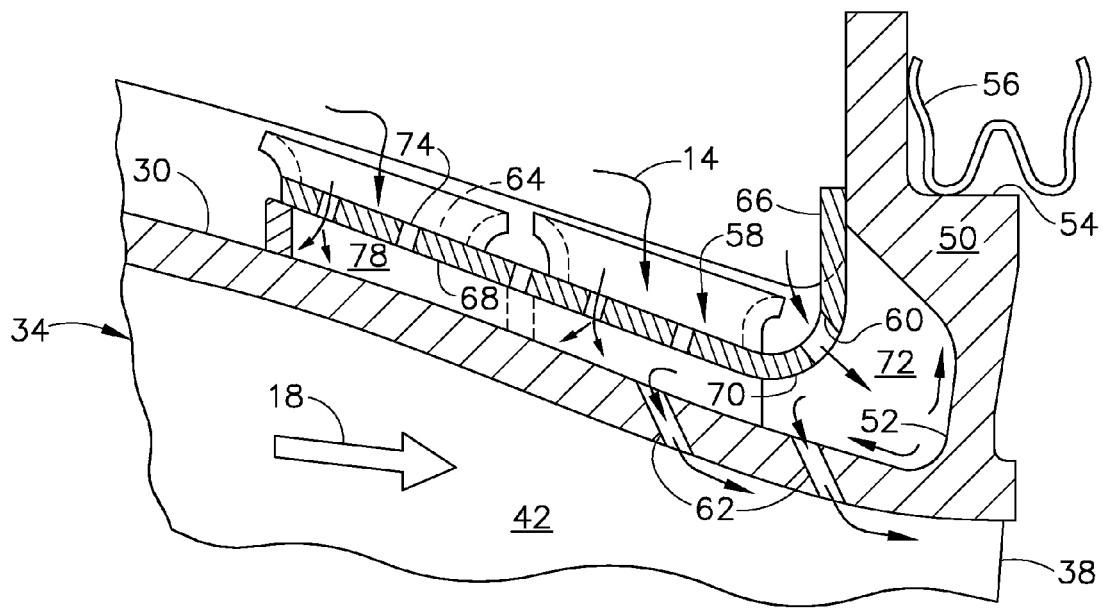
FIG. 2 is an enlarged axial sectional view of the aft portion of the turbine nozzle outer band.

As best shown in FIG. 2, the aft flange 50 has a radially inner end or root 52 joining the outer band 30 directly above the vane trailing edges 38. An opposite, radially outer end of the aft flange defines a seat 54 for receiving a suitable seal 56, such as the annular W-seal illustrated.

The seal 56 is axially trapped in the seat 54 between the outer end of the aft flange 50 and the forward face of the shroud hanger 26 to provide a preloaded seal therebetween.

During assembly, the hanger 26 imparts a substantial axial preload against the aft face of the aft flange 50 to accommodate differential expansion and contraction of the annular nozzle 20 during operation.

Accordingly, the aft flange 50 must be sufficiently stiff to withstand the operational loads during operation, and it is therefore typically thick or wide for enhanced strength.

Figure 3:
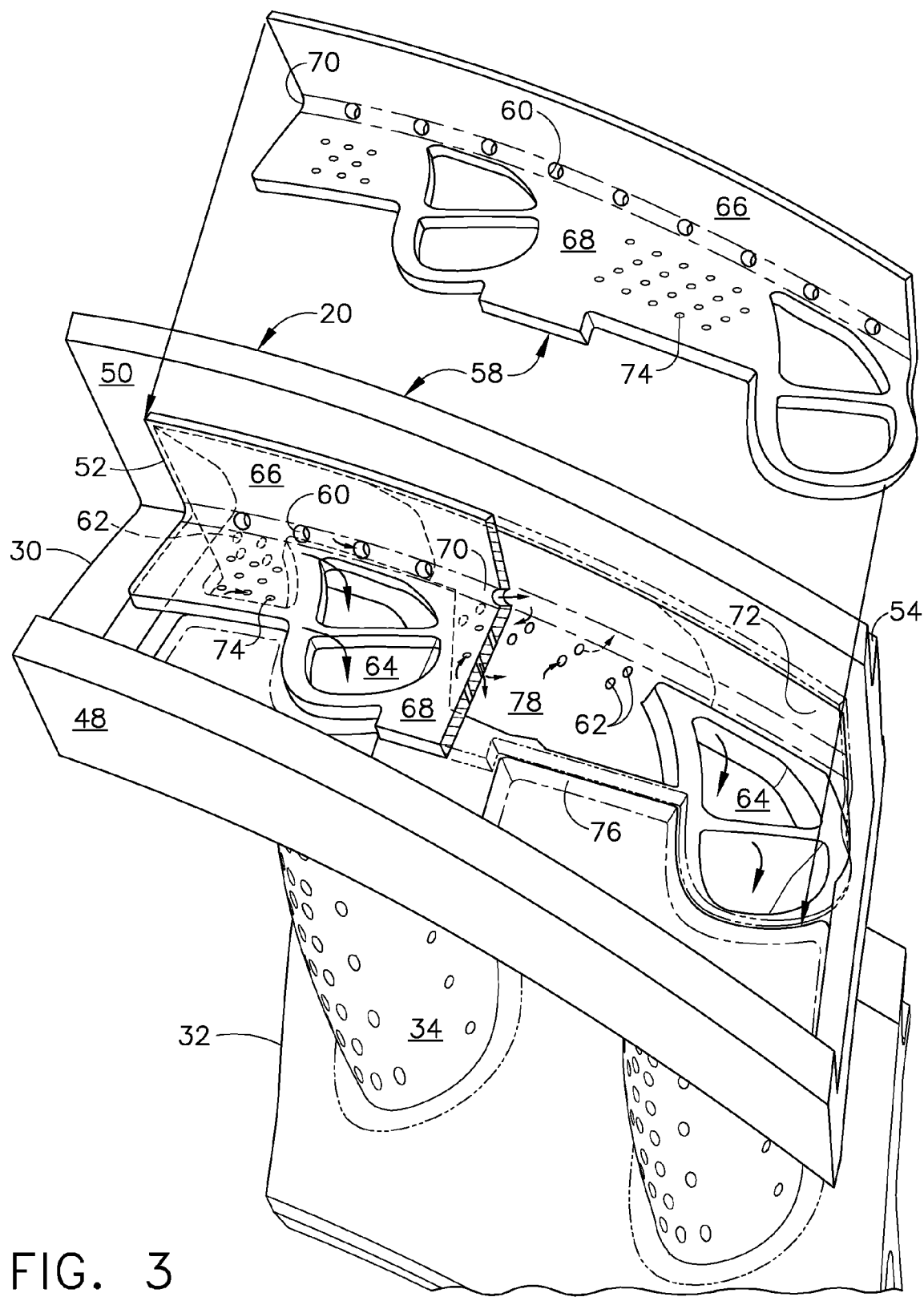
FIG. 3 is an isometric view of a doublet section of the turbine nozzle illustrated in FIG. 1 including an impingement baffle for the outer band thereof.

FIG. 3 illustrates a typical doublet segment of the entire annular turbine nozzle which segments are joined end to end at corresponding splitlines having suitable spline seals therebetween (not shown).

The aft flange 50 extends the full circumferential width of the nozzle segment between the opposite end faces thereof, and is integrally formed with the outer band itself for enhanced rigidity and strength.

Enhanced localized cooling of the aft flange 50 and the underlying aft overhang of the outer band 30 may be effected by locally introducing an impingement baffle 58 bridging the outer band and aft flange at the root 52 as shown in FIGS. 2 and 3.

The baffle 58 may be thin sheet metal suitably brazed to the exposed surfaces of the outer band and aft flange to locally cover the forward or inboard face of the root 52.

The baffle 58 is perforate with an array of impingement holes 60 locally positioned in an exemplary row to face the root 52 to provide local impingement cooling thereof.

A row of cooperating outlet holes 62 extends through the outer band 30 just forward of the root 52 in flow communication with the impingement holes 60 for discharging spent impingement air 14 after it cools the root.

Pressurized CDP discharge air 14 is suitably routed to the top of the nozzle 20 where it enters corresponding apertures 64 in the outer band 30 for internally cooling the vanes 34 themselves in conventional fashion.

Each vane is hollow with a middle partition that defines two chambers in a typical configuration, with each chamber having a respective one of the apertures 64 at the outer band.

Each chamber typically includes an internal impingement baffle (not shown) which receives air from the apertures 64, and each vane includes film cooling discharge holes in the sidewalls thereof for discharging the spent internal impingement air.

A portion of the cooling air routed to the outer band 30 is readily available at full CDP pressure to flow through the impingement holes 60 specifically dedicated for impingement cooling the flange root 52.

Correspondingly, the aft outlet holes 62 are specifically configured and located to cooperate with the root-cooling holes 60 for locally discharging the spent root impingement cooling air for additionally cooling the outer band overhang directly below the root 52.

In this way, localized cooling of the aft flange 50 at its root junction with the outer band directly over the vane trailing edges 38 is effected in an improved and more efficient manner.

In particular the aft flange 50 remains imperforate, and the spent root impingement air is therefore discharged through the aft outlet holes 62 located upstream of the vane trailing edges 38, and also upstream of the flowpath throats 44 for recapturing that air as non-chargeable air in the main nozzle flowpaths.

The impingement baffle 58 is specially configured to match the junction between the aft flange 50 and outer band 30, and therefore includes an aft lip 66 extending radially outwardly and parallel along the aft flange 50 below the outer seat 54.

A main panel 68 of the baffle extends axially forwardly from the lip 66 and is spaced above and parallel to the outer band.

The root impingement holes 60 extend radially through an arcuate fillet junction 70 between the lip 66 and panel 68 with downward inclination directed toward the fillet junction of the root 52 and outer band 30.

The cooperating outlet holes 62 are disposed forward of the impingement holes 60 further away from the root 52 to create a locally serpentine discharge flowpath. In this way, impingement cooling of the flange root 52 is first effected, with the spent impingement air reversing direction axially forward to convectively cool the outer surface of the outer band.

The spent air then changes direction again through the outlet holes 62 for further cooling this aft region of the outer band prior to discharge along the inner surface of the outer band.

In this way, the impingement air 14 first loses pressure as it first undergoes impingement against the flange root, and additionally loses pressure as it changes flow direction through the circuitous discharge flowpath to the outlet holes 62 for locally enhanced cooling effectiveness.

To further enhance localized cooling and reduce thermal gradients, the aft flange 50 further includes an undercut recess or pocket 72 in the root 52 and below the seat 54.

As shown in FIG. 2, the pocket 72 extends axially aft from the forward face of the aft flange 50 directly below the outer seat 54, and locally removes flange material and thermal mass in the flange root 52.

As shown in FIG. 3, the pocket 72 extends circumferentially over most of the width of the doublet segment between the opposite end faces at which the full thickness of the flange root remains.

The outer seat 54 may have any conventional form, such as the aft facing step disposed above the root 52. The underlying pocket 72 correspondingly extends both directly under the seat as well as forwardly therefrom.

The aft flange 50 therefore varies in axial thickness from forwardly thin over the height of the seat 54, to maximum thickness directly below the seat, and tapers or decreases in thickness over the height of the pocket 72 as the pocket recesses aft into the flange root 52, with the root being relatively thin along the aft face of the flange where it joins the outer band 30. The aft flange 50 maintains its full maximum thickness solely at the two end faces where the pocket terminates.

Since the baffle lip 66 is brazed to the forward face of the aft flange 50 at the inlet end of the recessed pocket 72, the impingement holes 60 are preferentially offset forward from the recessed flange root 52. The holes 60 face aft into the pocket to effect impingement cooling of the recessed and locally thinner root 52 directly below the wider outer seat 54.

The baffle lip 66 locally closes the entrance end of the pocket 72 to confine the impingement air therein, which is then constrained to flow axially forward to reach the outlet holes 62.

Preferably, the aft lip 66 is parallel to the aft flange 50 above the pocket 72. The impingement holes 60 are inclined downwardly through the fillet junction 70 to impingement cool the root 52 at its arcuate fillet junction with the outer band 30.

And, the outlet holes 62 are inclined aft through the outer band 30 forward of the pocket to define typical film cooling holes that discharge a protective layer or film of spent impingement air along the inner surface of the outer band 30 directly under the aft flange 50.

This circuitous discharge flowpath for the spent impingement air provides multiple or compound cooling effects at the stiff junction between the aft flange 50 and the aft end of the outer band 30 for substantially enhancing localized cooling thereof with non-chargeable cooling air recaptured upstream of the nozzle throats 44.

In one embodiment, the impingement holes 60 are spaced forwardly from the recessed root 62 as at about two to three diameters of the impingement holes 60 themselves, as shown in FIG. 2.

Impingement cooling requires a suitable spacing between the baffle and the intended cooling surface so that the jets of impingement air may be created at the baffle under large differential pressure and then travel at maximum velocity to impinge the root 52 with maximum cooling effect.

The introduction of the recessed pocket 72 not only reduces the thermal mass of the aft flange 50 to improve cooling, but provides suitable offset from the baffle 58 for maximizing impingement cooling effectiveness of the locally thinner root 52.

Enhanced impingement cooling may therefore be effected using a single row of the impingement holes 60 at the baffle fillet junction 70 in the one embodiment, with each hole 60 being tubular with a suitable flow diameter, and preferably spaced forward at about two to three hole diameters from the fillet junction between the root 52 and outer band 30.

In other embodiments, the impingement holes 60 may be tailored in array configuration and flow size for controlling the flowrate and resulting cooling to address local hot spots for example.

Figure 4:
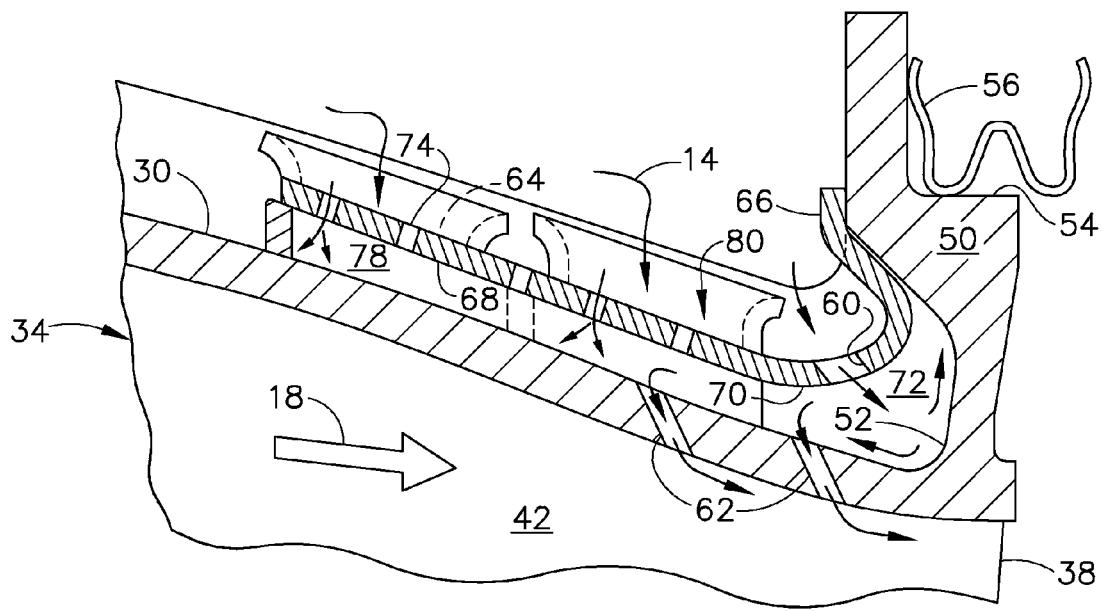
FIG. 4 is an enlarged axial sectional view, like FIG. 2, of the aft portion of the turbine nozzle outer band in accordance with another embodiment.

In yet another configuration of the impingement baffle, designated 80 in FIG. 4, the aft lip 66 includes a local bend extending aft into the top of the pocket 72 under the seat 54. The lip bend is disposed closely adjacent to the bevel undercut in the aft flange under the seat 54 to provide a small radial clearance or gap therebetween of a few mils.

In this way, the top of the pocket 72 is locally reduced in size by the bent or bowed lip to reduce local circulation of the spent impingement air, and correspondingly reduce thermal gradients in the flange under the seat.

Since the flange 50 extends circumferentially, the reduced thermal gradients therein correspondingly reduce chording or circumferential straightening of the annular nozzle flowpath at the vane trailing edges for improving its performance.

The impingement holes 60 in the FIG. 4 configuration may remain in the fillet junction 70 within the same two to three hole diameters from the recessed root.

Although the baffle 58 may be configured solely with its radial lip 66, it preferably also includes the axial panel extension 68 to provide additional impingement cooling of the outer band.

In this configuration, the main panel 68 further includes additional impingement holes 74 distributed forwardly of the downstream fillet impingement holes 60, and suitably spaced above the outer band 30 for providing localized impingement cooling thereof.

The outer band 30 preferably includes cast ribs 76 surrounding the vane apertures 64 and bridging those apertures with the two end faces upon which the main panel 68 may be seated and sealingly brazed thereto.

In this way, a main pocket 78 is defined between the main panel 68 and the outer band forward of the aft pocket 72, and disposed in flow communication therewith.

In this configuration, only two rows of the outlet holes 62 may be used to collectively discharge all spent impingement air from the baffle, and are spaced in turn forwardly from the single aft row of impingement holes 60.

Those two rows of outlet holes 62 may then collectively discharge both the spent impingement air from the aft pocket 72 after it first reverses direction, as well as the spent impingement air from the forward, main pocket 78.

The aft flange 50 of the nozzle outer band 30 may be locally impingement cooled with minimal changes in nozzle design for substantially reducing operating temperature in this important local region, which in turn reduces thermal gradients and operating stress for increasing low cycle fatigue life of the nozzle.

The aft flange 50 may be preferentially undercut to form the aft pocket 72 for locally reducing thermal mass of the flange while maintaining sufficient strength and stiffness for supporting the seal 56.

The special impingement baffle 58, including its aft lip 66, is brazed to the aft flange 50 to close the so formed aft pocket 72 and further enhances the structural integrity thereof while confining the spent impingement air preferentially at the aft end of the outer band.

The aft flange remains imperforate, and the spent impingement air is discharged from the outlet holes 62 upstream of the nozzle throats 44 for recapturing that air prior to discharge from the nozzle for increasing efficiency thereof.

The impingement air preferentially first cools the root end of the aft flange, with the spent air then being reused to cool the outer surface of the band along the discharge flowpath through the upstream outlet holes 62, followed in turn by preferential film cooling of the inner surface of the band directly below the aft flange itself.

Analysis of these improved designs indicate a substantial reduction in operating temperature over the junction of the aft flange and outer band, along with a corresponding reduction of thermal gradients and operating stress and improved durability and life.

Turbine efficiency is also increased by using non-chargeable impingement air instead of discharging spent, chargeable cooling air directly through the aft flange as found in other high-performance conventional cooling configurations.

And, the simple modifications to effect improved aft flange cooling may also be retrofit to existing nozzle designs, as well as originally implemented in new designs.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising:
outer and inner bands bounding a row of vanes extending axially between leading and trailing edges;
said outer band including an imperforate aft flange disposed above said trailing edges, with an undercut pocket in a root of said flange, said pocket extending axially aft from a forward face of said aft flange, and being contiguous with an outer surface of said outer band; and
an impingement baffle bridging said outer band and aft flange at said root to cover said pocket, and including a row of impingement holes facing said pocket.

2. A nozzle according to claim 1 further comprising a row of outlet holes extending through said outer band forward of said root in flow communication with said pocket for discharging spent impingement air.

3. A nozzle according to claim 2 wherein said outlet holes are disposed forward of said impingement holes.

4. A nozzle according to claim 3 wherein:
said aft flange includes a radially outer seat disposed above said pocket; and
said impingement baffle includes an aft lip extending radially along said aft flange below said seat, and a main panel spaced above said outer band, with said impingement holes extending through a fillet junction therebetween.

5. A nozzle according to claim 4 wherein:
said aft lip is parallel to said aft flange above said pocket;
said impingement holes are inclined downwardly through said fillet junction to impingement cool said root at its junction with said outer band; and
said outlet holes are inclined aft through said outer band forward of said pocket.

6. A nozzle according to claim 4 wherein said impingement holes are spaced forwardly from said root at about two to three diameters of said impingement holes.

7. A nozzle according to claim 4 wherein said main panel further comprises additional impingement holes distributed forwardly of said fillet impingement holes and spaced above said outer band.

8. A nozzle according to claim 4 further comprising a single row of said impingement holes at said fillet junction.

9. A nozzle according to claim 4 further comprising two rows of said outlet holes spaced in turn forwardly from said row of impingement holes.

10. A nozzle according to claim 4 wherein said outer seat comprises an aft facing step disposed above said root, and said pocket extends forwardly there from.

11. A turbine nozzle comprising:
radially outer and inner bands joined to opposite ends of vanes;
each vane including axially opposite leading and trailing edges and circumferentially opposite pressure and suction sides extending radially between said bands;
said outer band including an imperforate aft flange extending radially outwardly above said trailing edges;
said aft flange having a radially inner root joining said outer band, and an opposite, radially outer seat for receiving a seal, wherein said aft flange further includes an undercut pocket in said root of said aft flange, said pocket extending axially aft from a forward face of said flange, and being contiguous with an outer surface of said outer band;
an impingement baffle bridging said outer band and aft flange at said root with a row of impingement holes facing said root; and
a row of outlet holes extending through said outer band forward of said root in flow communication with said impingement holes for discharging spent impingement air.

12. A nozzle according to claim 11 wherein said impingement baffle includes an aft lip extending radially outwardly along said aft flange, and a main panel spaced above said outer band, and said impingement holes extend radially through a fillet junction there between.

13. A nozzle according to claim 12 wherein said outlet holes are disposed forward of said impingement holes.

14. A nozzle according to claim 11 wherein:
said aft lip is parallel to said aft flange above said pocket;
said impingement holes are inclined downwardly through said fillet junction to impingement cool said root at its junction with said outer band; and
said outlet holes are inclined aft through said outer band forward of said pocket.

15. A nozzle according to claim 14 wherein said impingement holes are spaced forwardly from said root at about two to three diameters of said impingement holes.

16. A nozzle according to claim 11 wherein said main panel further comprises additional impingement holes distributed forwardly of said fillet impingement holes and spaced above said outer band.

17. A nozzle according to claim 11 further comprising a single row of said impingement holes at said fillet junction.

18. A nozzle according to claim 11 further comprising two rows of said outlet holes spaced in turn forwardly from said row of impingement holes.

19. A nozzle according to claim 11 wherein said outer seat comprises an aft facing step disposed above said root, and said pocket extends forwardly there from.

20. A nozzle according to claim 11 wherein said aft lip includes a bend extending aft into said pocket closely adjacent to said aft flange under said seat to provide a gap therebetween.

* * * * *